(12) United States Patent
Gotschlich

(10) Patent No.: US 8,096,172 B2
(45) Date of Patent: Jan. 17, 2012

(54) WIRELESS COMMUNICATION APPARATUSES, SYSTEMS AND METHODS

(75) Inventor: Martin Gotschlich, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 894 days.

(21) Appl. No.: 12/131,951

(22) Filed: Jun. 3, 2008

(65) Prior Publication Data
US 2009/0293602 A1 Dec. 3, 2009

(51) Int. Cl.
*G01M 17/02* (2006.01)

(52) U.S. Cl. .......................................................... 73/146

(58) Field of Classification Search ............... 73/146, 73/146.5
See application file for complete search history.

(56) References Cited

U.S. PATENT DOCUMENTS

| | | | |
|---|---|---|---|
| 5,247,831 A * | 9/1993 | Fioravanti | 73/178 R |
| 5,749,984 A | 5/1998 | Frey et al. | |
| 6,112,587 A * | 9/2000 | Oldenettel | 73/146.5 |
| 7,010,968 B2 | 3/2006 | Stewart et al. | |
| 7,227,458 B2 | 6/2007 | Watabe et al. | |
| 7,313,952 B2 * | 1/2008 | Brusarosco et al. | 73/146 |
| 7,412,879 B2 * | 8/2008 | Serra et al. | 73/146 |
| 7,536,903 B2 * | 5/2009 | Schillinger et al. | 73/146.5 |
| 7,546,764 B2 * | 6/2009 | Morinaga et al. | 73/146 |
| 7,673,505 B2 * | 3/2010 | Hammerschmidt | 73/146.5 |
| 2003/0058118 A1 | 3/2003 | Wilson | |
| 2003/0197603 A1 * | 10/2003 | Stewart et al. | 340/442 |
| 2004/0090322 A1 * | 5/2004 | Tsujita | 340/442 |
| 2005/0248446 A1 * | 11/2005 | Watabe et al. | 340/442 |
| 2007/0107505 A1 | 5/2007 | Schillinger et al. | |
| 2007/0240502 A1 * | 10/2007 | Morinaga et al. | 73/146 |

FOREIGN PATENT DOCUMENTS

| EP | 0887211 B1 | 1/2003 |
|---|---|---|
| EP | 1293362 B1 | 9/2007 |

* cited by examiner

*Primary Examiner* — Freddie Kirkland, III
(74) *Attorney, Agent, or Firm* — Patterson Thuente Christensen, Pedersen, P.A.

(57) ABSTRACT

Methods of wirelessly communicating are disclosed. In one embodiment, a transmit angle along a circumference of a revolution is determined, a transmit time of the transmit angle based at least in part on a time required to complete a revolution is determined, and a signal is wirelessly transmitted at the transmit angle and the transmit time. Apparatuses and systems are also disclosed.

16 Claims, 3 Drawing Sheets ns,172 B2

WIRELESS COMMUNICATION APPARATUSES, SYSTEMS AND METHODS

BACKGROUND OF THE INVENTION

Tire pressure monitoring systems (TPMS) are used to monitor conditions within and surrounding vehicle tires. Parameters typically monitored include local temperature and pressure information. Many TPMS comprise modules of sensors and other components that monitor local tire information, with power typically supplied to the modules by local batteries, energy harvesters or scavengers, or other means. Typically, a module is located in or near each wheel of a vehicle, although some TPMS comprise fewer modules.

Many TPMS further comprise wired or wireless transceivers for communicating between each wheel module and a central receiver in another part of the vehicle. Challenges exist, however, in establishing and maintaining successful wireless communications between wheel modules and the receiver. For example, it can be difficult to identify which module is reporting from which vehicle tire, often referred to as tire or module "localization." Further, the broadcast and transmission time of each module is not synchronized with tire rotation. Depending on the location and orientation of the wheel module relative to both the associated tire and the receiver, attempted data transmission and receipt can occur randomly as the wheel module rotates during vehicle motion. This can result in varying and/or poor wireless channel characteristics and signal quality that reduce the effectiveness of the TPMS.

SUMMARY OF THE INVENTION

Methods of wirelessly communicating are disclosed. In one embodiment, a transmit angle along a circumference of a revolution is determined, a transmit time of the transmit angle based at least in part on a time required to complete a revolution is determined, and a signal is wirelessly transmitted at the transmit angle and the transmit time.

Tire pressure monitoring systems (TPMS) are also disclosed. In one embodiment, a TPMS comprises at least one wheel module and a receiver. The at least one wheel module comprises a pressure sensor adapted to sense a pressure of a tire, an acceleration sensor adapted to sense a first edge and a second edge of a footprint area of the tire, a control unit coupled to the pressure sensor and the acceleration sensor, and a transmitter. The control unit is adapted to determine a transmission time, wherein the transmission time is when the wheel module will be at a transmit angle and is based at least in part on a time of the first edge and a time of the second edge, and the transmitter is adapted to transmit a signal comprising information related to the pressure of the tire at the transmission time. The receiver is adapted to receive the signal.

Monitoring apparatuses are also disclosed. In one embodiment, a monitoring apparatus comprises a first sensor, a second sensor, a control unit and a transmitter. The first sensor is adapted to sense a condition. The second sensor is adapted to sense a first edge and a second edge of a circumferential portion. The control unit is coupled to the first sensor and the second sensor and is adapted to determine a transmission time, wherein the transmission time is when the monitoring apparatus will be at a transmit angle and is based at least in part on a time of the first edge and a time of the second edge. The transmitter is adapted to transmit a signal at the transmission time, the signal comprising information related to the condition.

BRIEF DESCRIPTION OF THE DRAWINGS

The invention may be more completely understood from the following detailed description of various embodiments in connection with the accompanying drawings, in which.

Figure 1:
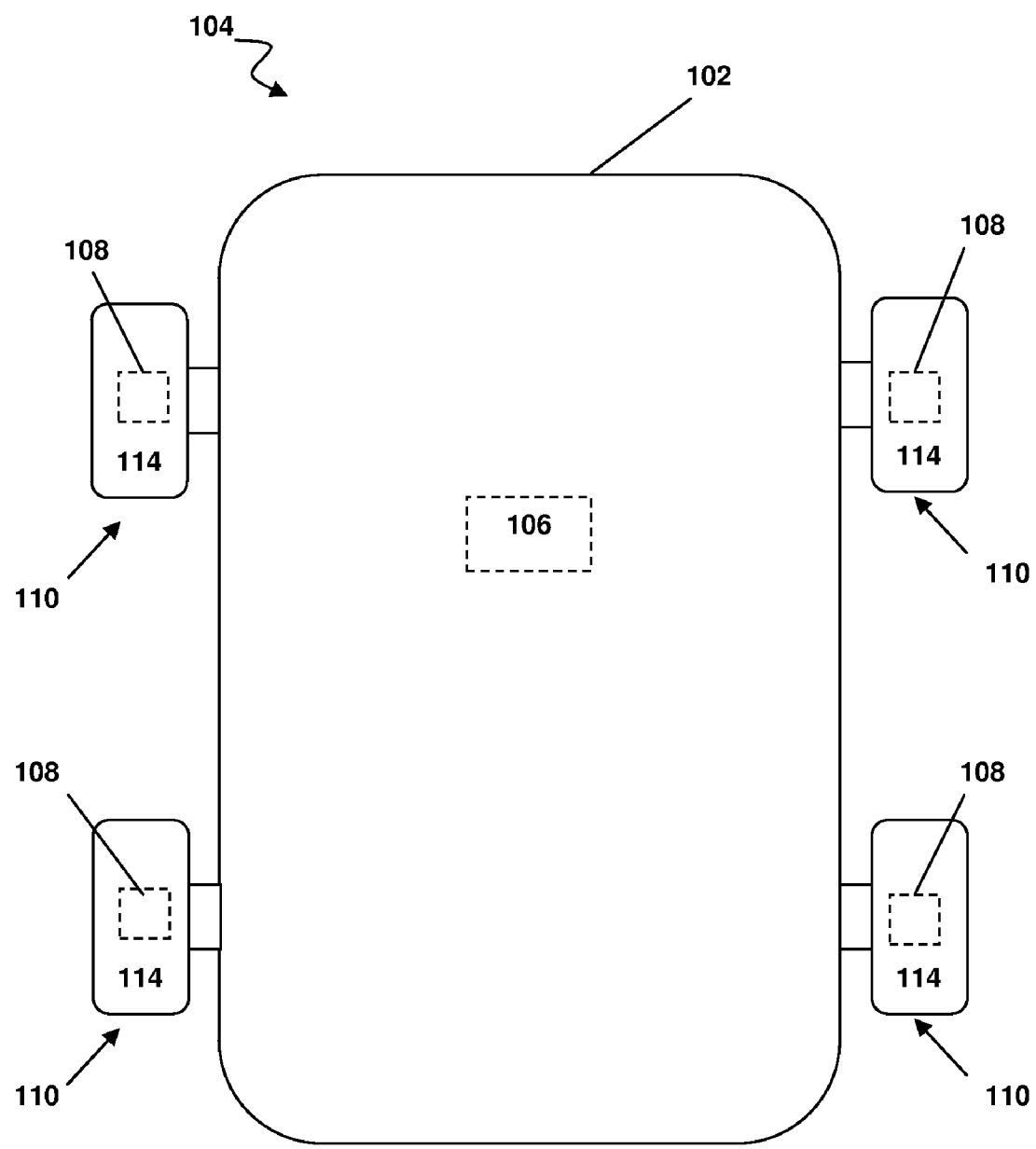
FIG. 1 is a perspective diagram of a vehicle according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to wireless communication apparatuses, systems and methods. In various embodiments, the invention relates to tire pressure monitoring systems (TPMS), such as TPMS that include wireless communications between one or more wheel modules and a central receiver. Various embodiments of the invention coordinate communications to and from the modules with the rotation of the relevant wheel, thereby improving signal quality and efficacy. The invention can be more readily understood by reference to FIGS. 1-6 and the following description. While the invention is not necessarily limited to the specifically depicted application(s), the invention will be better appreciated using a discussion of exemplary embodiments in specific contexts.

FIG. 1 depicts a vehicle 102 that includes a tire pressure monitoring system (TPMS) 104. TPMS 104 comprises a receiver 106 and a plurality of wheel modules 108. In one embodiment, one wheel module 108 is associated with each wheel 110 of vehicle 102. In other embodiments, TPMS 104 includes fewer wheel modules 108 than wheels 110. Each wheel module 108 is mounted or otherwise affixed to a rim 112 (refer to FIG. 3) within a tire 114 of each wheel 110 in one embodiment. In other embodiments, wheel modules 108 can be mounted to an interior tread (or "footprint") 113 or sidewall 115 portion of tire 114 or some other area of wheel 110 or rim 112 (refer also to FIG. 3). Receiver 106 can be mounted within, on or to vehicle 102, in various locations and positions in various embodiments, although receiver 106 is typically positioned to best send and receive signals with TPMS 104 and other relevant components and systems in vehicle 102.

In one embodiment, each wheel module 108 transmits local information, such as tire pressure and other data, to receiver 106. In other embodiments, receiver 106 can also transmit information to each wheel module 108. While these communications between wheel modules 108 and receiver 106 can be partially or entirely wired, wireless radio frequency (RF) transmissions are used in one embodiment.

Figure 2:
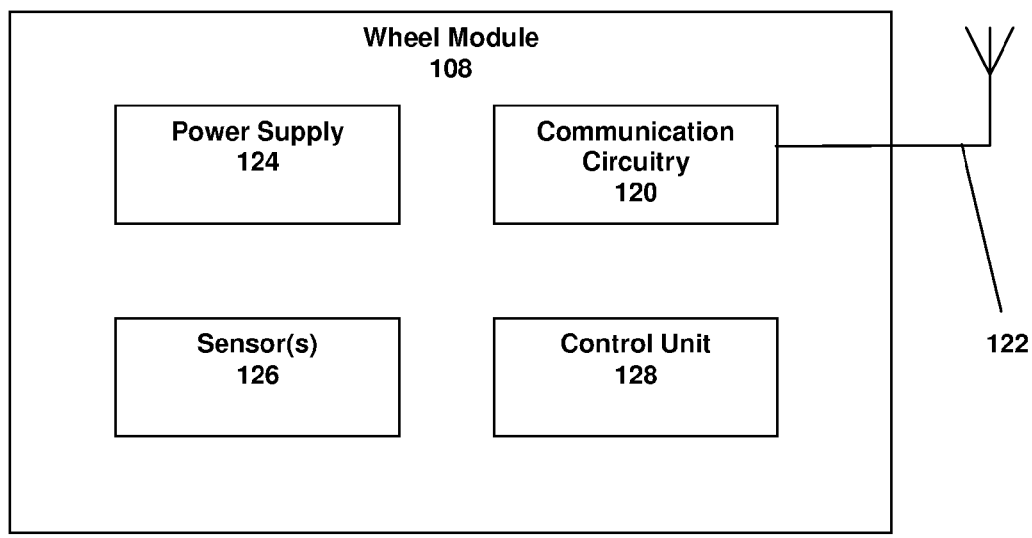
FIG. 2 is a block diagram of a wheel module according to an embodiment.
Figure 3:
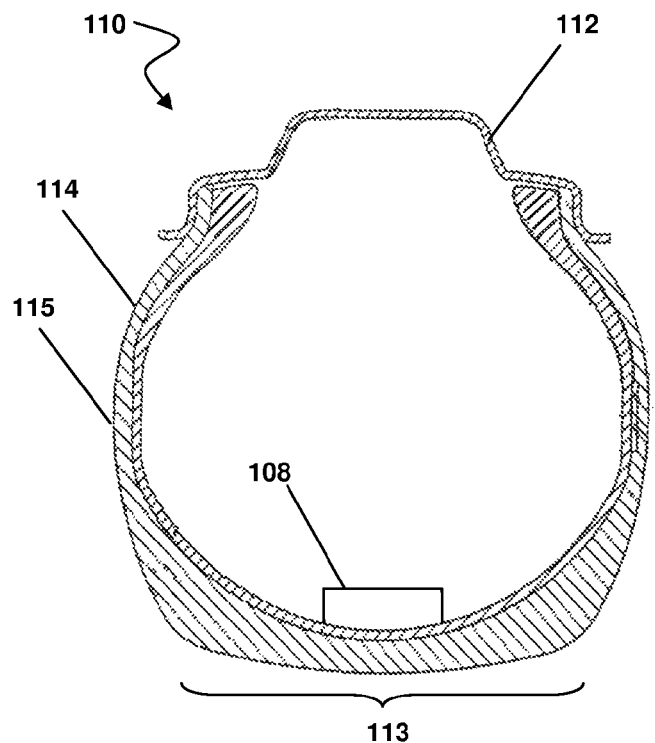
FIG. 3 is a sectional view of a tire according to an embodiment.

One embodiment of wheel module 108 thus comprises communication circuitry 120, such as RF communication circuitry in one embodiment, and an antenna 122, as depicted in the block diagram of FIG. 2. Communication circuitry 120, as well as wheel module 108 as a whole, is powered by a power supply 124. In one embodiment, power supply 124 comprises a battery. In another embodiment, power supply 124 comprises an energy harvester, energy scavenger or other similar power source.

The energy needed to power wheel module 108 can place great demand on power supply 124. This is of particular concern in embodiments such as the one depicted in FIGS. 1 and 2 in which robust RF communications are desired between wheel modules 108 and receiver 106 in an inhospitable environment. While the size of power supply 124 may be increased, practical limits are imposed by the environment in which wheel module 108 is mounted. For example, the additional bulk and mass, not to mention cost, associated with a larger power supply 124 may make mounting of wheel module 108 in wheel 110, especially within tire 110 itself, difficult or even impossible. Replaceable batteries are not practical from maintenance, system integrity and reliability perspectives, and minimum lifetimes may be legislated in some jurisdictions. Additional challenges presented in the use of RF communications include the mounting and positioning of antenna 122 in each wheel 110 and the mounting and positioning of receiver 106 and its antenna.

According to one embodiment of the invention, wheel module 108 further comprises a sensor 126 capable of sensing rotation and/or position information of wheel 110 and providing such information to communication circuitry 120 in order to synchronize RF communications with a favorable position of wheel module 108 during operation of vehicle 102. In one embodiment, sensor 126 comprises an acceleration sensor, and wheel module 108 can be advantageously mounted to the inner tread region of tire 114. In this embodiment, sensor 126 can sense wheel module 108 rotating into and out of footprint 113 of tire 114 on a driving surface. Based upon the timing of wheel module 108 within and out of footprint 113 of tire 114, a control unit 128 of wheel module 108, and/or receiver 106, can determine an optimal time for communications with wheel module 108.

While this embodiment, described in more detail below, comprises an acceleration sensor within wheel module 108 mounted to an interior tread portion of tire 114, other configurations can be used in other embodiments. For example, an acoustic or other sensor can be used, while in tire pressure monitoring embodiments, sensor 126 further comprises one or more pressure sensors. Wheel module 108 can also be mounted in other areas of tire 114 and wheel 110 in other embodiments.

Figure 4:
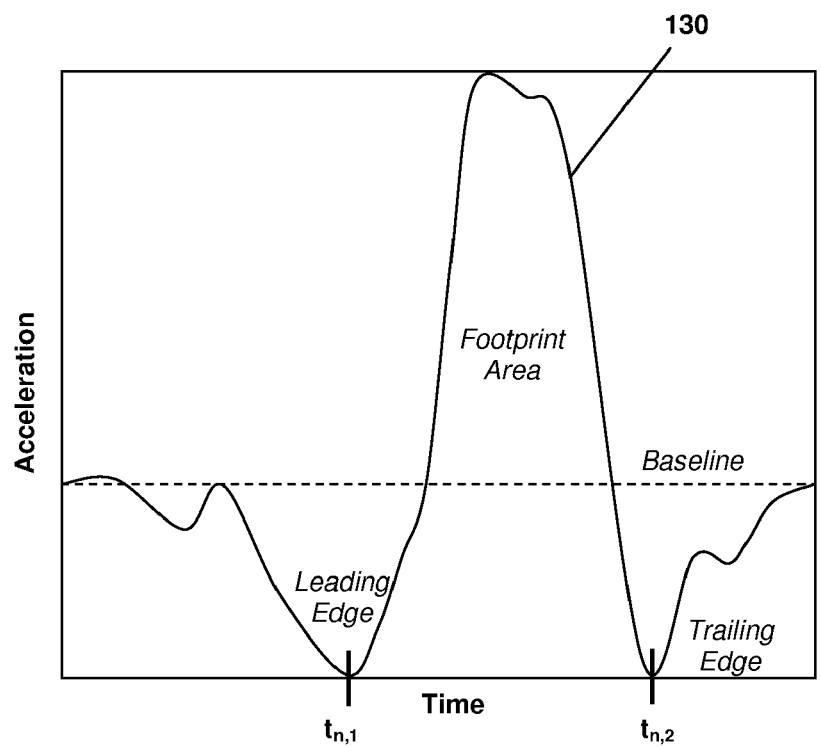
FIG. 4 is a graph according to an embodiment.

In FIG. 4, an example output of sensor 126 during rotation of wheel 110 is graphically depicted. In the embodiment of FIG. 4, sensor 126 comprises an acceleration sensor, and the output depicted at 130 is acceleration over time. Output 130 illustrates the increased activity registered by sensor 126 as wheel module 108 rotates through the footprint area 113 of tire 114, beginning at a leading edge at time $t_{n,1}$ and ending at a trailing edge $t_{n,2}$. In one embodiment, wheel module 108 measures the time intervals between these acceleration pulses that mark the entry and exit of sensor 126, and therefore wheel module 108, in footprint area 113.

Figure 5:
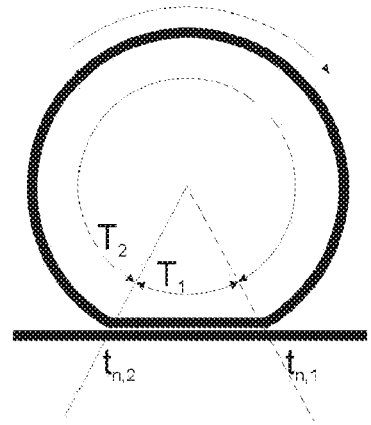
FIG. 5 is a wheel revolution diagram according to an embodiment.

Referring also to FIG. 5, two pulses per wheel revolution n occur at times $t_{n,1}$ and $t_{n,2}$. The wheel circumference can then be divided into two segments, one during which sensor 126 is within footprint area 113 and one during which sensor 126 is not within footprint area 113, with one of the segments being significantly smaller than the other:

$T_{n,1}=t_{n,2}-t_{n,1}$ (footprint duration)

$T_{n,2}=t_{n+1,1}-t_{n,2}$ (non-footprint duration)

$T_{n,1} \ll T_{n,2}$

The sum of the two segments yields the duration of a complete wheel revolution:

$T_n=T_{n,1}+T_{n,2}=t_{n+1,1}-t_{n,1}$

Figure 6:
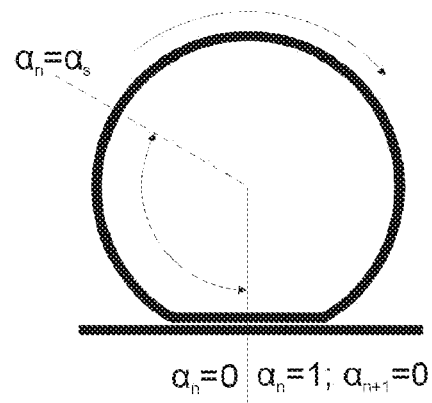
FIG. 6 is a wheel revolution diagram according to an embodiment.

An assumption is then made that the periodic duration T of one wheel revolution, which is equivalent to the speed of vehicle 102, is constant. Referring to FIG. 6, a desired transmit angle $\alpha_s$ is predefined according to a portion of the wheel circumference in one embodiment, synonymous with a portion of a periodic duration, and a zero point is defined in the center of footprint area 113:

$\alpha_n=0$ (start of a wheel revolution)

$\alpha_n=\alpha_s$ (transmit angle)

$\alpha_n=1$ (end of a wheel revolution, which simultaneously corresponds to the start of the next revolution, $\alpha_{n+1}=0$)

In one embodiment, the transmit time $t_{n,s}$ during the revolution n is determined from the measured times $t_{n-1,1}$ of the preceding revolution n−1 and $t_{n,1}$ and $t_{n,2}$ of the current revolution n, as well as the desired transmit angle $\alpha_s$, as follows:

$$t_{n,s} = \frac{T_{n-1}}{\alpha_s} + \frac{t_{n,1} + t_{n,2}}{2}$$

$$t_{n,s} = \frac{t_{n,1} - t_{n-1,1}}{\alpha_s} + \frac{t_{n,1} + t_{n,2}}{2}$$

Thus, a constant transmit angle during wireless transmissions from wheel module 108 to receiver 106 can be maintained. The angle for each one of the plurality of wheel modules 108 in vehicle 102 can vary, according to a particular position of each wheel module 108 and receiver 106. Further, in one embodiment the times $t_{n,1}$ and $t_{n,2}$ are transmitted at a constant latency significantly less than T to receiver 106 in vehicle 102, the principle can also be used analogously for angle-synchronous communications from receiver 106 to each wheel module 108. In one embodiment, such transmissions are implemented using a 125 kHz low frequency transmission.

The transmissions between each wheel module 108 and receiver 106 can therefore be timed and transmitted when each wheel module 108 is at an advantageous position with respect to a rotation of wheel 110. Higher-quality transmissions are therefore possible, as well as transmissions requiring lower transmit power. Additionally, transmissions which are unsuccessful or must be repeated are also reduced or eliminated.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A method of wirelessly communicating comprising:
   determining an entry of an acceleration sensor mounted inside a tire into a footprint region of the tire from an output signal of the acceleration sensor;
   determining an exit of the acceleration sensor from the footprint region of the tire from the output signal of the acceleration sensor;
   determining a center of the footprint region from the entry and the exit;
   determining a transmit angle, measured from the center of the footprint region, along a circumference of a revolution of the tire;
   determining a transmit time of the transmit angle based at least in part on a time required to complete a revolution; and
   wirelessly transmitting a signal at the transmit angle and the transmit time.

2. The method of claim 1, further comprising determining a footprint region duration and a non-footprint region duration of the acceleration sensor from the entry and the exit.

3. The method of claim 1, wherein determining a transmit angle further comprises predetermining a transmit angle along the circumference of a revolution.

4. The method of claim 1, wherein determining a transmit time further comprises:
   determining a time of the entry in a first revolution;
   determining a time of the entry in a second revolution;
   determining a time of the exit in a second revolution; and
   determining the transmit time from the time of the entry in the first revolution, the time of the entry in the second revolution, the time of the exit in the second revolution and the transmit angle.

5. A vehicle communication system comprising:
   at least one wheel module mounted inside a tire and adapted to transmit a signal at a transmit time determined at least in part from a rotational entry time into a footprint region of the tire of an acceleration sensor of the wheel module and a rotational exit time from the footprint region of the acceleration sensor and at a predetermined transmit angle measured from a center point of the footprint region, the center point determined from the entry and exit times; and
   a receiver adapted to receive the signal.

6. The system of claim 5, wherein the at least one wheel module further comprises:
   a controller adapted to determine the transmit time based at least in part on the entry time, the exit time and the predetermined transmit angle.

7. The system of claim 5, wherein the receiver is mounted to the vehicle.

8. The system of claim 5, wherein the at least one wheel module further comprises a pressure sensor.

9. A tire pressure monitoring system comprising:
   at least one wheel module comprising
      a pressure sensor adapted to sense a pressure of a tire,
      an acceleration sensor adapted to sense a first edge and a second edge of a footprint area of the tire,
      a control unit coupled to the pressure sensor and the acceleration sensor and adapted to determine a transmission time, wherein the transmission time is when the wheel module will be at a transmit angle and is based at least in part on a time of the first edge and a time of the second edge, and
      a transmitter adapted to transmit a signal comprising information related to the pressure of the tire at the transmission time; and
   a receiver adapted to receive the signal.

10. A monitoring apparatus comprising:
    a pressure sensor adapted to sense a condition;
    an acceleration sensor adapted to sense a first edge and a second edge of a circumferential portion;
    a control unit coupled to the pressure sensor and the acceleration sensor and adapted to determine a transmission time and a center of the circumferential portion, wherein the transmission time is when the monitoring apparatus will be at a transmit angle measured from the center and is based at least in part on a time of the first edge and a time of the second edge; and
    a transmitter adapted to transmit a signal at the transmission time, the signal comprising information related to the condition.

11. The apparatus of claim 10, wherein the circumferential portion comprises a footprint area of a tire.

12. The apparatus of claim 10, wherein the transmitter is a wireless transmitter.

13. The apparatus of claim 10, further comprising a receiver.

14. The apparatus of claim 13, wherein the receiver is adapted to receive a signal at the transmission time.

15. The apparatus of claim 10, wherein the transmit angle is predetermined.

16. The apparatus of claim 15, wherein the transmit angle is stored by the control unit.

* * * * *